Figure 1:
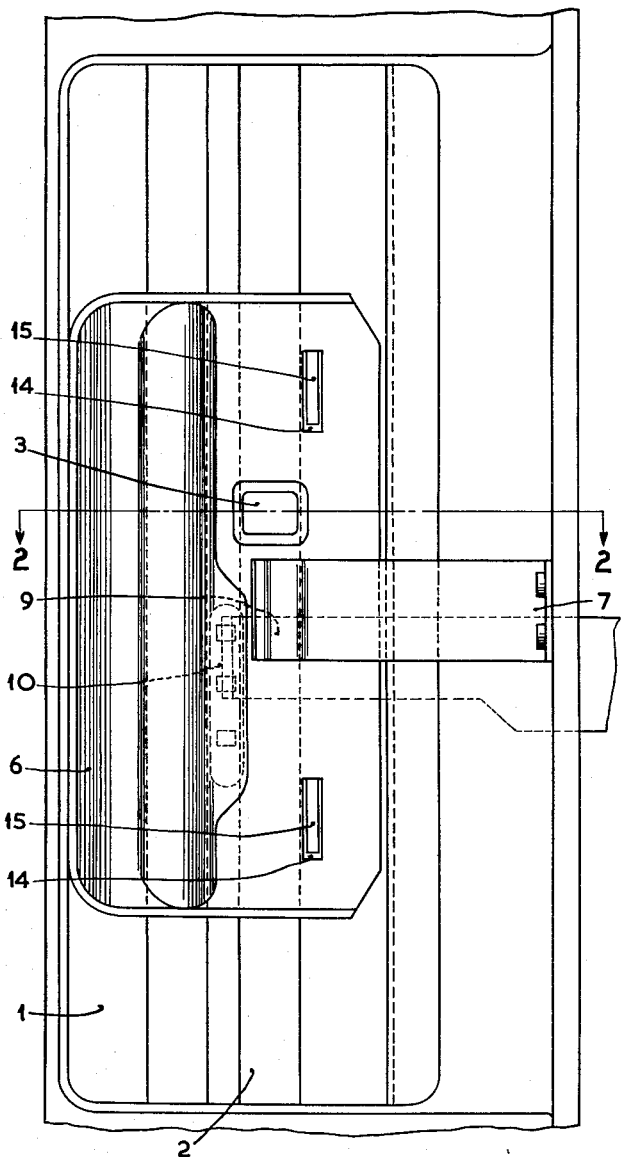

Aug. 8, 1961  F. L. VAN WEENEN  2,995,063
MOTION PICTURE PROJECTOR
Filed April 24, 1956

INVENTOR
FRANCISCUS LAMBERTUS VAN WEENEN
BY
AGENT

United States Patent Office 2,995,063
Patented Aug. 8, 1961

---

2,995,063
MOTION PICTURE PROJECTOR
Franciscus Lambertus van Weenen, Eindhoven, Netherlands, assignor, by mesne assignments, to North American Philips Company, Inc., New York, N.Y., a corporation of Delaware
Filed Apr. 24, 1956, Ser. No. 580,375
Claims priority, application Netherlands Sept. 19, 1955
2 Claims. (Cl. 88—17)

The invention relates to a home or amateur motion picture projector and more particularly to a film transporting arrangement therefor.

The known projectors are provided with a picture gate consisting of a resilient, movable part which is urged against a stationary part. The film is moved between these parts by transport or claw means which projects through an aperture in the stationary part. The film is inserted by introducing it between the two parts of the film gate. The transport means projecting through the stationary part interferes with the free introduction of the film between the two parts, i.e. it contacts the side edge of the film so that the film cannot be moved into position. In large, professional projectors the two parts can be moved away from one another by mechanical means and held at a certain distance from one another so that the introduction of the film can be readily carried out. However, in small home or amateur film projectors such mechanical means are too costly. Thus these two parts must be moved away from one another manually in order to introduce at the same time the film over the transport means and between the two parts. This requires a certain amount of dexterity of the operator and there is a constant danger that the film may be scratched by the transport means and thus be damaged.

The invention has for its principal object to overcome the aforesaid disadvantage, and for this purpose the stationary part is provided with a longitudinal rib over which the movable part extends in such a manner that the introduction of the film between the two parts moves the movable part against the spring force automatically due to the rigidity of the film and the film is guided over the transport means at a certain distance therefrom.

Consequently, by means of a simple design, it is possible to insert the film between the two parts, the rigidity of the film moving the parts sufficiently away from one another, these parts being held in these positions so that the film can be placed between the two parts without the risk of the film contacting the transport means. Even unskilled persons may readily insert the film without any risk.

The invention is particularly important for 8 mm. film projectors because other solutions to this problem have proved too costly for such projectors.

For the sake of completeness it should be noted that it is known to provide a transport roller for films which is provided with a stationary guide or with stationary rollers for guiding the film over this transport roller with an upright edge, the diameter of which exceeds the diameter of the teeth. However, it is then necessary to displace the transport roller in an axial direction in order to obtain a sufficient space between the transport roller and the stationary guide or the stationary rollers to introduce the film. After the film has been brought into contact with the transport roller in this manner, the roller must be moved back in an axial direction into its initial position in order to ensure a sufficient guiding of the film by the stationary rollers or guide. The stationary guide or rollers do not extend, in this case, around the transport roller and the simple introduction of the film between the transport roller and the guide cannot be carried out without difficulty.

Figure 2:
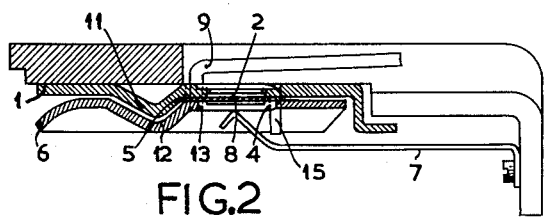

The invention will be described more fully with reference to one embodiment in the accompanying drawing in which:

FIG. 1 is a front elevational view of a portion of a projector taken in the direction of the optical axis of a film window and, FIG. 2 is a sectional view taken on the line 2—2 of FIG. 1.

Referring to the drawing, a stationary part 1 comprising a metal plate is provided with a film path 2 and an aperture 3. The film is prevented from lateral movement by upright edges 4 and 5. Adjacent to the stationary part 1 is a movable part 6 which is urged against the stationary part by means of a spring 7. The movable part is provided with openings 14, through which extends prolongations 15 of the upright edges 4 provided on the stationary part 1. The movable part 6 can in this manner be moved away from the stationary part 1 against the action of the spring 7 and is guided during said movement by the prolongations 15. Between the two parts 1 and 6 is arranged a film 8 which can be moved periodically due to the co-operation of a claw 9 with perforations in the film. For this purpose, the claw 9 extends through an opening 10 in the stationary part 1.

The stationary part 1 is provided with a longitudinal rib 11 extending in the direction of the film path 2 and is located between this path and the longitudinal boundary of part 1. The movable part 6 is also provided with a similar longitudinal rib 12 which extends over the rib 11. During the insertion of the film between the two parts 1 and 6, these parts are moved away from one another due to the rigidity of the film. The rib 11 is of such a height that during the further insertion of the film the latter remains at a certain distance from the end 13 of the gripper 9 until the film reaches its predetermined position. Then the movable part 6 can be urged, under the action of the spring 7, against the part 1, so that the film is held flat between the parts 1 and 6.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A film projector including a film gate through which the film may be projected comprising an upper stationary part provided with a first, V-shaped longitudinal rib and an opening in another portion thereof, a lower movable part adjacent said stationary part having a second V-shaped longitudinal rib complementary with said first rib, spring means biasing said movable part toward said stationary part, a claw projecting through said opening for moving the film in said gate, said film being inserted laterally between said stationary and movable parts and due to the natural rigidity of the film said film moves the movable part against the force of said spring means thereby permitting the film to be guided into the proper operating position at a given distance from said claw.

2. A film projector comprising a film gate having a film window and a film movable through said film gate and past said window and projected therethrough comprising an upper stationary part provided with a first, V-shaped longitudinal rib extending in the same direction as said film movement and an aperture in another portion thereof, a lower movable part adjacent to said stationary part having a second V-shaped longitudinal rib complementary with said first rib, spring means biasing said movable part toward said stationary part, a claw projecting through said aperture for moving said film in said gate, said film being inserted laterally between said stationary and movable parts and due to the natural rigidity of the film said film moves the movable part against the force of said spring means thereby permitting the film to be guided into the operating position at a given distance from said claw, said second rib being of such a dimension that upon the insertion between said stationary and movable parts the film does not contact said claw until the film has reached the proper operating position.

References Cited in the file of this patent

UNITED STATES PATENTS

| | | |
|---|---|---|
| 1,933,066 | Merle | Oct. 31, 1933 |
| 2,089,276 | Lindstrom et al. | Aug. 10, 1937 |
| 2,232,811 | Sperry | Feb. 25, 1941 |
| 2,234,714 | Wellman | Mar. 11, 1941 |
| 2,457,915 | Nemeth | Jan. 4, 1949 |

FOREIGN PATENTS

| | | |
|---|---|---|
| 242,836 | Great Britain | Nov. 19, 1925 |